United States Patent Office 3,133,119
Patented May 12, 1964

3,133,119
SUBSTITUTED ACETANILIDES AND
PROPIONANILIDES
Edward Joseph Nikawitz, Glen Rocks, N.J., assignor to
The Givaudan Corporation, New York, N.Y., a corporation of New Jersey
No Drawing. Filed Nov. 9, 1961, Ser. No. 151,400
15 Claims. (Cl. 260—558)

The present invention relates to novel substituted acetanilides and propionanilides.

The compounds of this invention may be represented by the following general formula:

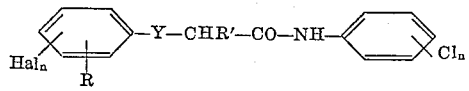

where Hal represents chlorine, or bromine, Y is O or S, R and R' are H or $CH_3$ and n is 1 to 3. The foregoing general formula is not to be understood as being a representation that all compounds which are covered by it are encompassed by this invention. Instead, the following compounds only are the subject of the present invention:
2-(4-chlorophenoxy)-3',4'-dichloroacetanilide
2-(4-chloro-3-methylphenoxy)-3',4'-dichloroacetanilide
2-(2,4,5-trichlorophenoxy)-3',4'-dichloropropionanilide
2-(4-chlorophenylthio)-3',4'-dichloroacetanilide
2-(4-bromophenoxy)-3',4'-dichloroacetanilide
2-(3-chlorophenoxy)-3',4'-dichloroacetanilide
2-(4-chloro-3-methylphenoxy-3'-chloroacetanilide
2-(2,4,5-trichlorophenoxy)-4'-chloropropionanilide
2-(2-chlorophenoxy)-3',4'-dichloropropionanilide
2-(4-chloro-2-methylphenoxy)-3'-chloroacetanilide
2-(4-chloro-2-methylphenoxy)-4'-chloroacetanilide
2-(2-chlorophenoxy)-3',4'-dichloroacetanilide
2-(4-chlorophenoxy)-3',4'-dichloropropionanilide
2-(4-chlorophenoxy)-4'-chloro-3'-trifluoromethyl-
  acetanilide The novel compounds of this invention are characterized by their common property of enhancing the bacteriostatic activity of hexachlorophene, 2,2'-methylene-bis-(3,4,6-trichlorophenol), in the presence of soap. This utility is unexpected, as the compounds, by themselves, exhibit no bacteriostatic activity in the presence of soap, when tested by the procedure hereinafter described. The unexpectedness of the aforementioned utility of the novel compounds of this invention is further attested by the fact that numerous compounds which are closely related to them chemically fail to exhibit this utility. Reference is made to the following compounds:

2-(2,4,5-trichlorophenoxy)-3'-chloro-6'-methylacetanilide
2-(2,4,5-trichlorophenoxy)-3'-chloro-6'-
  methylpropionanilide
2-(2,4,5-trichlorophenoxy)-3',4'-dichloroacetanilide
2-(4-chloro-2-methylphenoxy)-3'-methylacetanilide
2-(2,4,5-trichlorophenoxy)-2',4'-dimethylpropionanilide
2-(4-chlorophenoxy)-2'-chloroacetanilide
2-(4-chlorophenoxy)-2',5'-dichloroacetanilide
2-(4-chlorophenylthio)-5'-chloro-2'-methylacetanilide
2-(2,4,5-trichlorophenoxy)-4'-chloroacetanilide
2-(4-chlorophenoxy)-3'-nitroacetanilide
2-(4-chlorophenoxy)-2'-methyl-4'-nitroacetanilide
2-(2,4,5-trichlorophenoxy)-2',4'-dimethylacetanilide
2-(4-chlorophenoxy)-2',4',5'-trichloroacetanilide
2-(2-carbamoylphenoxy)-3',4'-dichloroacetanilide
2-(2-chlorophenoxy)-2',5'-dichloropropionanilide
2-(4-chloro-3,5-dimethylphenoxy)-3',4'-
  dichloroacetanilide
2-(4-chloro-2-methylphenoxy)-acetanilide
2-(3,4-dimethylphenoxy)-4'-chloroacetanilide
2-(4-chloro-2-methylphenoxy)-2',5'-dichloracetanilide
2-(2-chlorophenoxy)-4'-chloropropionanilide
2-(2-chlorophenoxy)-2',4',5'-trichloropropionanilide
2-(4-chloro-3-methylphenoxy)-3'-methylacetanilide
2-(4-chloro-2-methylphenoxy)-2'-methylacetanilide
2-(3,4-dimethylphenoxy)-3',4'-dichloroacetanilide
2-(2-chlorophenoxy)-4'-methylpropionanilide
2-(2,4,6-trichlorophenoxy)-3',4'-dichloroacetanilide
2-(2,4,6-trichlorophenoxy)-4'-chloroacetanilide
2-(2-chlorophenoxy)-2'-chloroacetanilide
2-(3-chlorophenoxy)-2'-chloroacetanilide
2-(3-chlorophenoxy)-2',5'-dichloroacetanilide
2-(2-chlorophenoxy)-2',5'-dichloroacetanilide
2-(4-chlorophenoxy)-4'-methylpropionanilide
2-(4-chlorophenoxy)-2',5'-dichloropropionanilide In using the compounds of this invention, they may be employed in varying amounts. Thus, for example, hexachlorophene/compound ratios of 40 to 60, by weight, may be employed. If desired, however, larger or smaller amounts of the novel compounds, on the aforesaid basis, may be used.

The amount of hexachlorophene which may be used in soap is well known. U.S. Patent 2,535,077, December 21, 1950, issued to Kunz and Gump, for example, may be utilized, in this connection.

In general, the novel compounds of this invention may be prepared by either of the following routes:

1. 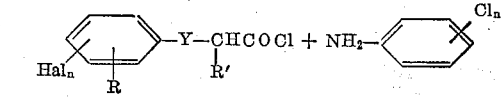

and

2. 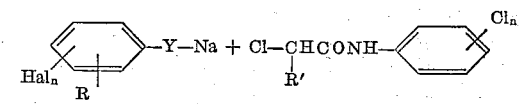

where Hal, R, Y, R' and n have the same significance as stated above.

The bacteriostatic activity of the compounds was tested by two fold serial dilution in A.O.A.C. agar, followed by inoculation with *Staphylococcus aureus*. All of the compounds by themselves in the test system were inactive at 2.0 micrograms (μg.) per ml. The compounds were tested in combination with equal parts of hexachlorophene. The ratio of soap (Maxine soap, Swift & Co.) to compounds or mixtures of compounds in each instance was 100/1. Consequently, a bacteriostatic level of 0.25 μg./ml. is the equivalent of 0.125 μg. of hexachlorophene. Since the bacteriostatic level of hexachlorophene is 1.0 μg./ml., it is clear that a bacteriostatic level of 0.25 μg./ml. of the combination of compound and hexachlorophene represents an 8-fold increase in the activity of hexachlorophene.

The bacteriostatic activity of hexachlorophene and combinations thereof with the compounds of this invention, as obtained by the indicated test, is given below:

| Compound: | Bacteriostatic Level (μg./ml.) |
|---|---|
| Hexachlorophene | 1.0 |
| 2-(4-chlorophenoxy)-3',4'-dichloroacetanilide | 0.25 |
| 2-(4-chlorophenoxy)-4'-chloro-3'-trifluoromethylacetanilide | 0.25 |
| 2-(4-chloro-3-methylphenoxy)-3',4'-dichloroacetanilide | 0.25 |
| 2-(2,4,5-trichlorophenoxy)-3',4'-dichloropropionanilide | 0.25 |
| 2-(4-chlorophenylthio)-3',4'-dichloroacetanilide | 0.25 |
| 2-(4-bromophenoxy)-3',4'-dichloroacetanilide | 0.25 |
| 2-(3-chlorophenoxy)-3',4'-dichloroacetanilide | 0.25 |
| 2-(4-chloro-3-methylphenoxy)-3'-chloroacetanilide | 0.5 |
| 2-(2,4,5-trichlorophenoxy)-4'-chloropropionanilide | 0.5 |
| 2-(2-chlorophenoxy)-3',4'-dichloropropionanilide | 0.5 |
| 2-(4-chloro-2-methylphenoxy)-3'-chloroacetanilide | 0.5 |
| 2-(4-chloro-2-methylphenoxy)-4'-chloroacetanilide | 0.5 |
| 2-(2-chlorophenoxy)-3',4'-dichloroacetanilide | 0.5 |
| 2-(4-chlorophenoxy)-3',4'-dichloropropionanilide | 0.5 |

The following examples illustrate the invention without, however, limiting it thereto. The degrees are given in centigrade.

EXAMPLE 1

*2-(4-Chlorophenoxy)-3',4'-Dichloroacetanilide*

(a) (4-chlorophenoxy)acetic acid (18.6 g.) is suspended in 70 ml. of benzene in a 250 ml. flask fitted with a sealed stirrer, a dropping funnel and a reflux condenser the top of which is connected with an implement for absorption of hydrogen chloride and sulfur dioxide. Thionyl chloride (13 g.) is added during 30 minutes to the agitated suspension. The whole is then refluxed for 7 hours. A clear, brown solution of (4-chlorophenoxy)acetyl chloride results.

(b) 3,4-dichloroaniline (16.2 g.) dissolved in 50 ml. of benzene and sodium hydroxide (12 g.) dissolved in 200 ml. of water are charged into a 500 ml. flask fitted with a stirrer, a dropping funnel and a thermometer. The solution of (4-chlorophenoxy)acetyl chloride is added during one hour at 10° to the rapidly agitated mixture of the 3,4-dichloroaniline, benzene and aqueous alkali. Agitation is continued for 8 hours at room temperature. After standing for 20 hours the white solid is filtered, washed twice with 100 ml. of water and dried at room temperature for 20 hours. The product is recrystallized from 150 ml. of S.D. alcohol #30. Yield: 21.7 g. of a white solid; M.P. 134–135°.

Analysis for $C_{14}H_{10}Cl_3NO_2$.—Calcd.: percent C, 50.85; percent H, 3.04. Found: percent C, 51.10; percent H, 3.01.

EXAMPLE 2

*2-(4-Chloro-3-Methylphenoxy)-3',4'-Dichloroacetanilide*

(a) (4-chloro-3-methylphenoxy)acetic acid (36 g.), 150 ml. of benzene and 26 g. of thionyl chloride are brought to reaction according to the procedure a described in Example 1. After completion of the reaction the benzene is distilled at a pressure of 40 mm. of mercury. The residue is kept for 30 minutes at 50° at a pressure of 4 mm. of mercury. The resulting (4-chloro-3-methylphenoxy)acetyl chloride is dissolved in benzene to a volume of 100 ml.

(b) To an agitated solution of 4.0 g. of 3,4-dichloroaniline in 10 ml. of benzene are added 100 ml. of 5% sodium hydroxide. Fourteen ml. of the acid chloride solution 2a are dropped into the rapidly agitated mixture during one hour maintaining a temperature of 30° by cooling. Agitation is continued for 20 hours at room temperature. The resulting solid is filtered, washed twice with 100 ml. of water and dried for 20 hours at room temperature. It is dissolved in 180 ml. of refluxing S.D. alcohol #30. The solution is filtered and allowed to crystallize for 20 hours at —10°. The white crystals are filtered, washed with 10 ml. of ice cold S.D. alcohol #30 and dried to constant weight at room temperature at a pressure of 4 mm. of mercury; 6.7 g. of 2-(4-chloro-3-methylphenoxy)-3',4'-dichloroacetanilide melting at 127–129° are obtained.

EXAMPLE 3

*2-(2,4,5-Trichlorophenoxy)-3',4'-Dichloropropionanilide*

(a) 2-(2,4,5-trichlorophenoxy)propionic acid (40.5 g.), 250 ml. of benzene and 23 g. of thionyl chloride are brought to reaction according to the procedure described in Example 2a. The resulting 2-(2,4,5-trichlorophenoxy)propionyl chloride is dissolved in benzene to a volume of 100 ml.

(b) To an agitated solution of 6.1 g. of 3,4-dichloroaniline in 20 ml. of benzene are added 150 ml. of 2% sodium hydroxide. Twenty-five ml. of the acid chloride solution 3a are dropped into the rapidly agitated mixture during one hour maintaining a temperature of 30° by cooling. Agitation is continued for 20 hours at room temperature. The resulting solid is filtered, washed twice with 100 ml. of water and dried for 20 hours at room temperature. Yield: 11.5 g.; M.P. 141–143°. The product is dissolved in 120 ml. of refluxing S.D. alcohol #30. The solution is filtered and allowed to crystallize for 20 hours at —10°. The white crystals are filtered, washed with 10 ml. of ice cold S.D. alcohol #30 and dried to constant weight on the steam bath; 9.1 g. of 2-(2,4,5-trichlorophenoxy)-3',4'-dichloropropionanilide melting at 141–143° are obtained.

EXAMPLE 4

*2-(4-Chlorophenylthio)-3',4'-Dichloroacetanilide*

(a) (4-chlorophenylthio)acetic acid (33 g.), 200 ml. of benzene and 23 g. of thionyl chloride are brought to reaction according to the procedure described in Example 2a. The resulting (4-chlorophenylthio)acetyl chloride is dissolved in benzene to a volume of 100 ml.

(b) To an agitated solution of 6.5 g. of 3,4-dichloroaniline in 20 ml. of benzene are added 150 ml. of 2% sodium hydroxide. Twenty-five ml. of the acid chloride 4a are dropped into the rapidly agitated mixture during one hour maintaining a temperature of 30° by cooling. Agitation is continued for 20 hours at room temperature. The resulting solid is filtered, washed twice with 100 ml. of water and dried for 20 hours at room temperature. Yield: 12.3 g.; M.P. 138–142°. The product is dissolved in 250 ml. of refluxing S.D. alcohol #30. The solution is filtered and allowed to crystallize for 20 hours at —10°. The white crystals are filtered, washed with 10 ml. of ice cold S.D. alcohol #30 and dried to constant weight at room temperature at a pressure of 4 mm. of mercury; 10.1 g. of 2-(4-chlorophenylthio)-3',4'-dichloroacetanilide melting at 143–146° are obtained.

EXAMPLE 5

*2-(4-Bromophenoxy)-3',4'-Dichloroacetanilide*

To an agitated solution of 5.7 g. of 4-bromophenol in 150 ml. of S.D. alcohol #30 is added a solution of 1.2 g. of sodium hydroxide in 5 ml. of water. After addition of 7.2 g. of 2,3',4'-trichloroacetanilide, the mixture is agitated and refluxed for 8 hours. The whole is poured into 800 ml. of water and the resulting suspension is allowed to stand for 20 hours. The precipitated solid is filtered and washed with 200 ml. of water. The moist product is dissolved in 64 ml. of refluxing S.D. alcohol #30. The solution is filtered and allowed to crystallize for 20 hours at —10°. The white crystals are filtered, washed with 10 ml. of ice cold S.D. alcohol #30 and dried to constant weight at room temperature at a pressure of 4 mm. of mercury; 6.4 g. of 2-(4-bromophenoxy)-3',4'-dichloroacetanilide melting at 129–130° are obtained.

EXAMPLE 6

2-(3-Chlorophenoxy)-3',4'-Dichloroacetanilide (a) 3-chlorophenol (25 g.) is dissolved in an agitated solution of 16 g. of sodium hydroxide in 150 ml. of water. A solution of 18.4 g. of chloroacetic acid in 100 ml. of water is added during 1 hour at a temperature of 10°. After refluxing for 10 hours the whole is allowed to stand at room temperature for 20 hours. Muriatic acid (17 ml.) is added. An oil forms which solidifies on prolonged agitation. The solid is filtered, washed twice with 100 ml. of water and dried at room temperature at a pressure of 4 mm. of mercury. Yield: 29.6 g.; M.P.: 103–109°. It is recrystallized from 100 ml. of benzene; 25 g. of (3-chlorophenoxy)acetic acid melting at 108–110° are obtained.

(b) (3-chlorophenoxy)acetic acid (24 g.), 100 ml. of benzene and 19 g. of thionyl chloride are brought to reaction according to the procedure described in Example 2a. The resulting (3-chlorophenoxy)-acetyl chloride is dissolved in benzene to a volume of 100 ml.

(c) To an agitated solution of 6.5 g. of 3,4-dichloroaniline in 20 ml. of benzene are added 200 ml. of 1.5% sodium hydroxide. Thirty-one ml. of the acid chloride solution 6b are dropped into the rapidly agitated mixture during one hour maintaining a temperature of 30° by cooling. Agitation is continued for 20 hours. The resulting solid is filtered and washed twice with 100 ml. of water. The filtrate is kept under reduced pressure until the benzene has evaporated. Additional amounts of a solid product are formed which are filtered and washed with 100 ml. of water. The solid fractions are combined and dissolved in 250 ml. of refluxing S.D. alcohol #30. The solution is filtered and allowed to crystallize for 20 hours at —10°. The white crystals are filtered, washed with 10 ml. of ice cold S.D. alcohol #30 and dried to constant weight at room temperature at a pressure of 4 mm. of mercury; 9 g. of 2-(3-chlorophenoxy)-3',4'-dichloroacetanilide melting at 129–131° are obtained.

EXAMPLE 7

2-(4-Chloro-3-Methylphenoxy)-3'-Chloroacetanilide 3-chloroaniline (3.2 g.) dissolved in 10 ml. of benzene, 100 ml. of 5% sodium hydroxide and 14 ml. of the acid chloride solution of Example 2a are brought to reaction according to the procedure described in Example 2b. The crude compound weighs 7 g. after drying. It is a slightly tacky product which is converted to hard white crystals by trituration with 40 ml. of hexane. The crystals are filtered, washed with 10 ml. of hexane and dried to constant weight at room temperature at a pressure of 4 mm. of mercury; 6.7 g. of 2-(4-chloro-3-methylphenoxy)-3'-chloroacetanilide melting at 104–106° are obtained.

EXAMPLE 8

2-(2,4,5-Trichlorophenoxy)-4'-Chloropropionanilide

Employing the process of Example 3 but replacing 3,4-dichloroaniline by 4.8 g. of 4-chloroaniline and using 315 ml. of S.D. alcohol #30 for recrystallization there are obtained 9.0 g. of 2-(2,4,5-trichlorophenoxy)-4'-chloropropionanilide melting at 162–164°.

EXAMPLE 9

2-(2-Chlorophenoxy)-3',4'-Dichloropropionanilide (a) 2-(2-chlorophenoxy)propionic acid (40.1 g.), 125 ml. of benzene and 25 g. of thionyl chloride are brought to reaction according to the procedure described in Example 2a. The resulting 2-(2-chlorophenoxy)propionyl chloride is dissolved in benzene to a volume of 100 ml.

(b) To an agitated solution of 4.9 g. of 3,4-dichloroaniline in 20 ml. of benzene are added 150 ml. of 3.3% sodium hydroxide. Fifteen ml. of the acid chloride solution 9a are dropped into the rapidly agitated mixture during one hour maintaining a temperature of 30° by cooling. Agitation is continued for 20 hours at room temperature. Benzene (100 ml.) is added and the whole is agitated an additional hour. The benzene layer is separated in a separatory funnel and washed twice with 100 ml. of water. After distillation of the benzene at a pressure of 40 mm. of mercury, the residual heavy brown oil is dried for 1 hour at room temperature at a pressure of 4 mm. of mercury. The oil is dissolved in 55 ml. of refluxing S.D. alcohol #30. The solution is filtered and allowed to crystallize for 20 hours at room temperature. The resulting white crystals are filtered, washed with 10 ml. of ice cold S.D. alcohol #30 and dried to constant weight at room temperature at a pressure of 4 mm.; 6.1 g. of 2-(2-chlorophenoxy)-3',4'-dichloropropionanilide melting at 96–98° are obtained.

EXAMPLE 10

2-(4-Chloro-2-Methylphenoxy)-3'-Chloroacetanilide (a) (4-chloro-2-methylphenoxy)acetic acid (99.6 g.), 200 ml. of benzene and 72 g. of thionyl chloride are brought to reaction according to the procedure described in Example 2a. The resulting 2-(4-chloro-2-methylphenoxy)acetyl chloride is dissolved in benzene to a volume of 250 ml.

(b) To an agitated solution of 3.2 g. of 3-chloroaniline in 10 ml. of benzene are added 100 ml. of 5% sodium hydroxide. Thirteen ml. of the acid chloride solution 10a are dropped into the rapidly agitated mixture during 2 hours maintaining a temperature of 30° by cooling. Agitation is continued for 20 hours at room temperature. The formed solid is filtered and washed twice with 100 ml. of water. The filtrate is kept under reduced pressure until the benzene has evaporated. The newly formed solid is filtered and washed with 100 ml. of water. Both solid fractions are combined, dried for 20 hours at room temperature and then dissolved in a refluxing combination of 70 ml. of S.D. alcohol #30 and 5 ml. of water. The solution is filtered and allowed to crystallize for 20 hours at room temperature. The crystals are filtered, washed with 10 ml. of ice cold S.D. alcohol #30 and dried to constant weight at room temperature at a pressure of 4 mm. of mercury; 6.4 g. of 2-(4-chloro-2-methylphenoxy)-3'-chloroacetanilide melting at 116–120° are obtained.

EXAMPLE 11

2-(4-Chloro-2-Methylphenoxy)-4'-Chloroacetanilide

Employing the process of Example 10b but replacing 3-chloroaniline by 4-chloroaniline there are obtained 4.1 g. of white 2-(4-chloro-2-methylphenoxy)-4'-chloroacetanilide melting at 137–141°.

EXAMPLE 12

2-(2-Chlorophenoxy)-3',4'-Dichloroacetanilide (a) (2-chlorophenoxy)acetic acid (100 g.), 300 ml. of benzene and 77 g. of thionyl chloride are brought to reaction according to the procedure described in Example 2a. The resulting (2-chlorophenoxy)-acetyl chloride is dissolved in benzene to a volume of 200 ml.

(b) To an agitated solution of 8.1 g. of 3,4-dichloroaniline in 20 ml. of benzene are added 200 ml. of 1.5% sodium hydroxide. Nineteen ml. of the acid chloride solution 12a are dropped into the rapidly agitated mixture during one hour maintaining a temperature of 30° by cooling. Agitation is continued for 20 hours. The resulting solid is filtered and washed twice with 100 ml. of water. The filtrate is kept under reduced pressure until the benzene has evaporated. The newly formed solid is filtered and washed with 100 ml. of water. Both solid fractions are combined, dried for 20 hours at room temperature and then dissolved in 150 ml. of refluxing S.D. alcohol #30. The solution is filtered and allowed to crystallize for 20 hours at −10°. The crystals are filtered, washed with 10 ml. of ice cold S.D. alcohol #30 and dried to constant weight at room temperature at a pressure of 4 mm. of mercury; 11 g. of 2-(2-chlorophenoxy)-3',4'-dichloroacetanilide melting at 122–124° are obtained.

EXAMPLE 13

2-(4-Chlorophenoxy)-3',4'-Dichloropropionanilide (a) Sodium methylate (27 g.) is added to an agitated solution of 64 g. of 4-chlorophenol in 200 ml. of methanol. A turbid solution results. Ethyl α-bromopropionate is added to the agitated, refluxing solution during one hour. Refluxing is continued for 6 hours. A solution of 40 g. of sodium hydroxide in 300 ml. of water is added during 30 minutes. The whole is refluxed for 6 hours. Water (600 ml.) is added. After cooling to room temperature, the solution is made acid towards Congo paper by means of muriatic acid. A slightly oily solid precipitates. The whole is allowed to stand for 4 days at room temperature. The solid is filtered and washed with 200 ml. of water. It is dissolved in a refluxing mixture of 110 ml. of S.D. alcohol #30 and 50 ml. of water. The filtered solution is allowed to crystallize for 20 hours at −10°. The crystals are filtered, washed with 30 ml. of ice cold 50% alcohol (by volume) and dried at room temperature at a pressure of 4 mm. of mercury; 29.6 g. of 2-(4-chlorophenoxy) propionic acid melting at 112–114° are obtained.

The alcoholic mother liquor is concentrated by distillation to a volume of 70 ml. The concentrate is allowed to crystallize for 20 hours at −10°. The resulting crystals are filtered, washed with 20 ml. of ice cold 50% alcohol (by volume) and dried at room temperature at a pressure of 4 mm. of mercury; 26.5 g. of 2-(4-chlorophenoxy)propionic acid melting at 110–112° are obtained.

(b) 2-(4-chlorophenoxy)propionic acid (55 g.), 150 ml. of benzene and 40 g. of thionyl chloride are brought to reaction according to the procedure described in Example 2a. The resulting 2-(4-chlorophenoxy)-propionyl chloride is dissolved in benzene to a volume of 100 ml.

(c) Following the process of Example 12b but employing 8.8 g. of 3,4-dichloroaniline, 200 ml. of 3% sodium hydroxide, 20 ml. of the acid chloride solution 13b and 160 ml. of S.D. alcohol #30 for crystallization, there are obtained 12.2 g. of 2-(4 chlorophenoxy)-3',4'-dichloropropionanilide melting at 133–134°.

EXAMPLE 14

2-(4-Chlorophenoxy)-4'-Chloro-3'-Trifluoromethylacetanilide

Following the process of Example 12b, but employing 7.8 g. of 5 amino-2-chlorobenzotrifluoride, 200 ml. of 1.5% sodium hydroxide, a solution of 0.04 mole of (4-chlorophenoxy-acetyl chloride in 27 ml. of benzene and a mixture of 180 ml. of S.D. alcohol #30 and 25 ml. of water for crystallization, there are obtained 9.2 g. of 2-(4-chlorophenoxy)-4'-chloro-3'-trifluoromethylacetanilide melting at 132–133°.

The foregoing illustrates the practice of this invention, which, however, is not to be limited thereby but is to be construed as broadly as permissible in view of the prior art and limited solely by the appended claims.

I claim:
1. A compound selected from the group consisting of 2-(4-chlorophenoxy)-3',4'-dichloroacetanilide; 2-(4-chloro-3-methylphenoxy)-3',4'-dichloroacetanilide; 2-(2,4,5-trichlorophenoxy)-3',4'-dichloropropionanilide; 2-(4-chlorophenylthio)-3',4'-dichloroacetanilide; 2-(4-bromophenoxy)-3',4'-dichloracetanilide; 2-(3-chlorophenoxy)-3',4'-dichloroacetanilide; 2-(4-chloro-3-methylphenoxy)-3'-chloroacetanilide; 2-(2,4,5-trichlorophenoxy)-4'-chloropropionanilide; 2-(2-chlorophenoxy)-3',4'-dichloropropionanilide; 2-(4-chloro-2-methylphenoxy)-3'-chloroacetanilide; 2-(4-chloro-2-methylphenoxy)-4'-chloroacetanilide; 2-(2-chlorophenoxy)-3',4'-dichloroacetanilide; 2-(4-chlorophenoxy)-3',4'-dichloropropionanilide; and 2-(4-chlorophenoxy)-4'-chloro-3'-trifluoromethylacetanilide.
2. 2-(4-chlorophenoxy)-3',4'-dichloroacetanilide.
3. 2 - (4 - chloro - 3 - methylphenoxy - 3',4' - dichloroacetanilide.
4. 2 - (2,4,5 - trichlorophenoxy) - 3',4' - dichloropropionanilide.
5. 2-(4-chlorophenylthio)-3',4'-dichloroacetanilide.
6. 2-(4-bromophenoxy)3',4'-dichloroacetanilide.
7. 2-(3-chlorophenoxy)-3',4'-dichloroacetanilide.
8. 2-(4-chloro-3-methylphenoxy)-3'-chloroacetanilide.
9. 2-(2,4,5-trichlorophenoxy)-4'-chloropropionanilide.
10. 2-(2-chlorophenoxy)-3',4'-dichloropropionanilide.
11. 2-(4-chloro-2-methylphenoxy)-3'-chloroacetanilide.
12. 2-(4-chloro-2-methylphenoxy)-4'-chloroacetanilide.
13. 2-(2-chlorophenoxy)-3',4'-dichloroacetanilide.
14. 2-(4-chlorophenoxy)-3',4'-dichloropropionanilide.
15. 2 - (4 - chlorophenoxy) - 4' - chloro - 3' - trifluoromethylacetanilide.

References Cited in the file of this patent

UNITED STATES PATENTS

| | | |
|---|---|---|
| 2,795,554 | Schumard | June 11, 1957 |
| 2,864,768 | Baldwin | Dec. 16, 1958 |
| 2,911,440 | Thullier et al. | Nov. 3, 1959 |
| 3,010,995 | Litvan et al. | Nov. 28, 1961 |

OTHER REFERENCES

Thompson et al.: Botan. Gazette, vol. 107, pages 476–507 (1946).

Newman et al.: J. Amer. Chem. Soc., vol. 69, pages 718–23 (1947).

Renzi et al.: J. Invest. Dermatol., vol. 30, pages 87–90 (1958).